(12) United States Patent
Sodhi et al.

(10) Patent No.: US 11,934,240 B2
(45) Date of Patent: Mar. 19, 2024

(54) PMU-SIDE THERMAL CONTROL

(71) Applicant: Apple Inc., Cupertino, CA (US)

(72) Inventors: Inder M. Sodhi, Palo Alto, CA (US); Achmed R. Zahir, Menlo Park, CA (US); Carmel Yamberger, Kfar-Saba (IL); Daniele Perretta, Redwood City, CA (US); Jan Krellner, Rancho Mission Viejo, CA (US); Ron Neuman, Ramat Hasharon (IL); James S. Ismail, Sunnyvale, CA (US); Keith Cox, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 16 days.

(21) Appl. No.: 17/664,000

(22) Filed: May 18, 2022

(65) Prior Publication Data

US 2023/0376091 A1 Nov. 23, 2023

(51) Int. Cl.
*G06F 1/28* (2006.01)
*G06F 1/20* (2006.01)
*G06F 11/30* (2006.01)

(52) U.S. Cl.
CPC .............. *G06F 1/206* (2013.01); *G06F 1/28* (2013.01); *G06F 11/3058* (2013.01)

(58) Field of Classification Search
CPC ......... G06F 1/206; G06F 1/28; G06F 11/3058
See application file for complete search history.

(56) References Cited

U.S. PATENT DOCUMENTS

| | | | |
|---|---|---|---|
| 10,338,669 | B2 | 7/2019 | Luo et al. |
| 10,871,818 | B1 * | 12/2020 | De La Cropte De Chanterac ...... G06F 1/325 |
| 2019/0146569 | A1 | 5/2019 | Nge et al. |
| 2020/0225723 | A1 | 7/2020 | Zonensain et al. |
| 2021/0203786 | A1 * | 7/2021 | Singhal ................. G06F 9/3877 |
| 2022/0311326 | A1 * | 9/2022 | Szczeszynski ........ H02M 1/007 |
| 2023/0051490 | A1 * | 2/2023 | Domingo ................ H02M 1/32 |

* cited by examiner

*Primary Examiner* — Zahid Choudhury
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to thermal control implemented by a power management unit. In some embodiments, the power management unit itself is configured to monitor thermal conditions, implement control for one or more thermal loops, and send reduction alerts, via an inter-chip interconnect, to the processor circuitry it powers. In some embodiments, the power management unit implements both thermal and electromigration control loops. Disclosed techniques may advantageously reduce or avoid thermal issues, potentially with reduced impact on processor performance relative to traditional techniques.

20 Claims, 8 Drawing Sheets

PMU-SIDE THERMAL CONTROL

BACKGROUND

Technical Field

This disclosure relates generally to thermal control and more particularly to thermal control implemented by a power management unit.

Description of the Related Art

Temperature control is important in various computing contexts. High temperatures may reduce performance, cause system crashes, damage components, etc. Intelligent thermal control techniques are one way of mitigating at least some of these issues and may involve reducing activity of one or more components to reduce their power consumption.

Electromigration (EM) refers to the transport of material caused by the gradual movement of ions in a conducting material. This effect may damage circuits such that they no longer function and is typically correlated with sustained high current draws, especially at higher temperatures. Reducing or eliminating EM may be particularly important as integrated circuit interconnects become smaller.

DETAILED DESCRIPTION

Power management units (PMUs) typically control a power converter that provides voltage rails to processor circuitry such as a system on a chip (SoC). A PMU may therefore be implemented on a separate chip than the processor circuitry. Traditionally, thermal control is implemented by the processor circuitry, e.g., to reduce activity when one or more components are at risk of experiencing thermal issues.

In some scenarios, power circuitry such as the power converter may experience thermal issues prior to the processor circuitry. In this context, thermal control by the processor may have various drawbacks. Therefore, in disclosed embodiments discussed below, the PMU itself implements control for one or more thermal loops and sends reduction alerts to the processor circuitry. This may allow the PMU to more efficiently regulate voltage, reduce or avoid its own thermal issues, EM issues, or both, relative to traditional techniques.

Further, in some embodiments with multiple PMUs that implement their own thermal controls, a processor is configured to identify loads causing thermal issues and perform targeted activity reduction of those loads. Targeted reduction may improve performance, relative to non-targeted reduction, by allowing non-problematic loads to operate without performance reduction.

In some embodiments, EM and thermal control mechanisms are implemented in a PMU in a sequential and nested manner such that the output of the EM control circuitry is an input to the thermal control circuitry.

Overview of Example System

Figure 1:
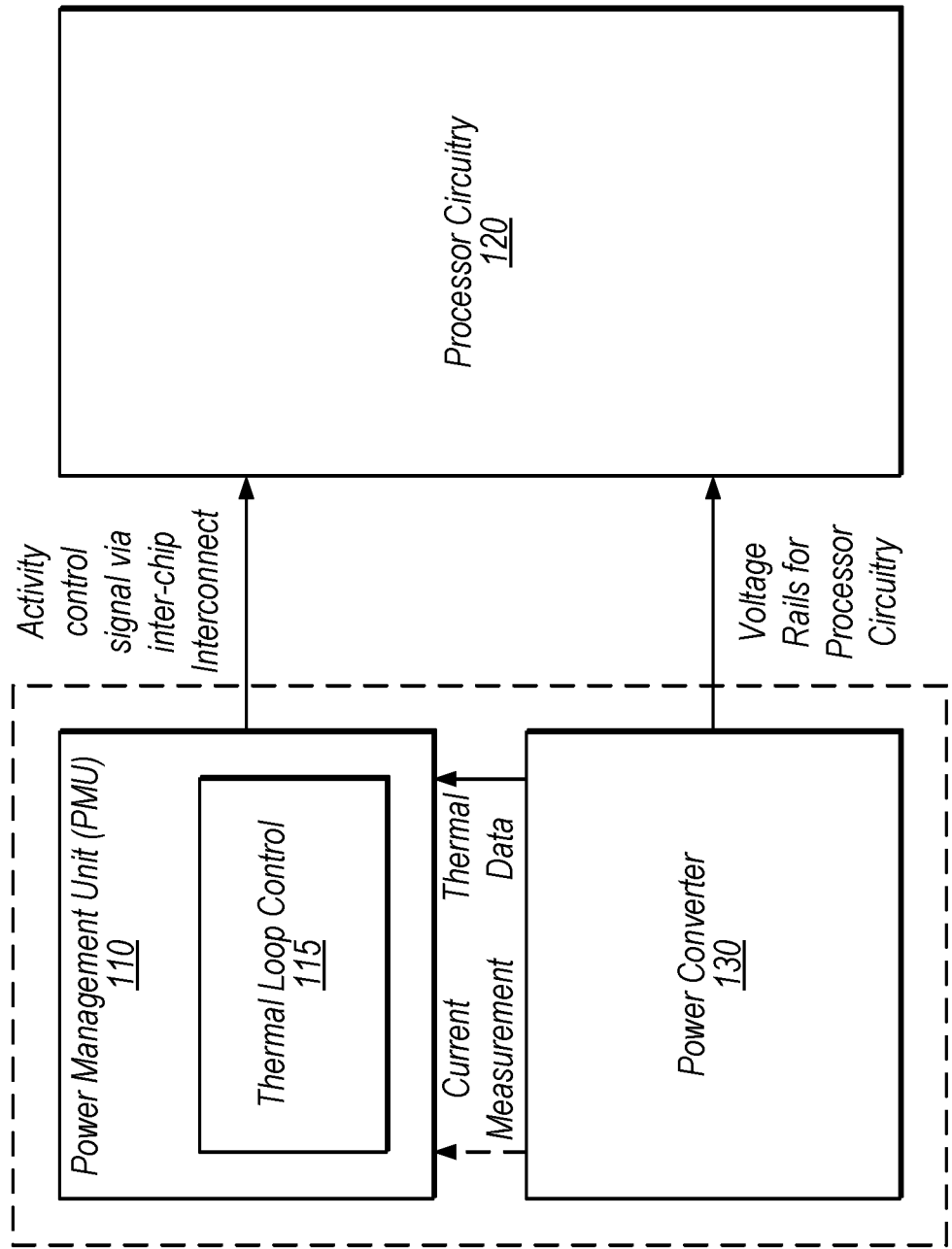
FIG. 1 is a block diagram illustrating an overview of an example system that includes a power management unit (PMU) that implements thermal loop control, according to some embodiments.

FIG. 1 is a block diagram illustrating elements of an example device that implements a PMU-controlled thermal loop, according to some embodiments. In the illustrated embodiment, the device includes PMU 110, processor circuitry 120, and power converter 130. PMU 110 in turn includes thermal loop control circuitry 115.

Power converter 130, in some embodiments, is configured to supply thermal data and electrical current measurements as inputs to PMU 110. These inputs may be used for thermal loop control, as discussed in detail below. The thermal data may be generated by a thermal sensor or a set of multiple thermal sensors. The current measurement information may be for one or more voltage rails provided by the power converter and may be used for EM loop control. Note that the electrical current measurement is shown using a dashed line to indicate that this input may be omitted in other embodiments, e.g., that do not implement EM loop control. As shown, power converter 130 provides power to processor circuitry 120 via one or more voltage rails. Power converter 130 may be a buck converter, for example, that is configured to step down an input voltage to a lower output voltage. Power converter 130 may be a coupled inductance voltage regulator (CLVR) that is configured to drive high-power rails. Speaking generally, power converter 130 may implement any of various appropriate types of power converters or power conditioning mechanisms.

Processor circuitry 120, in some embodiments, is configured to execute program instructions. Processor circuitry 120 may implement various types of processors, such as central processing units (CPUs), graphics processing units (GPUs), firmware processors such as microcontrollers, I/O units, memory management units, etc. Processor circuitry 120 may also include various fixed-function hardware. Processor circuitry 120 may implement thermal control actions based on internal thermal sensors, in addition to activity control based on signaling from the PMU.

PMU 110, in some embodiments, is configured to implement thermal loop control and provide, via an inter-chip interconnect, activity control signals to processor circuitry 120 (these signals may be referred to as control effort (CE) signals). In some embodiments, PMU 110 implements separate EM and thermal control loops, as discussed in detail below with reference to FIGS. 2 and 4. PMU 110 may implement respective proportional integral (PI) controllers, for example, for different control loops.

In some embodiments, power management unit 110 and power converter 130 are included in a single physical component, represented by the dashed-line box of FIG. 1. In other embodiments, these elements may be separate components.

Example Control Loop Chaining

Figure 2:
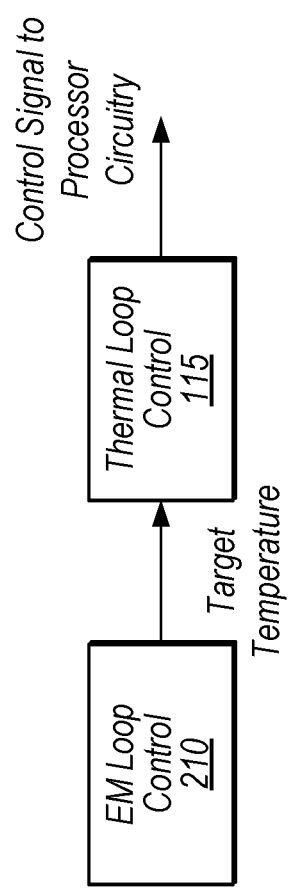
FIG. 2 is a block diagram illustrating an example in which an EM control loop provides a target temperature for a thermal control loop, according to some embodiments.

FIG. 2 is a block diagram illustrating an example sequential implementation in which an EM control loop provides a target temperature for a thermal control loop, according to some embodiments. In the illustrated embodiment, control circuitry includes EM control loop 210 and thermal control loop 115. As shown, EM control loop 210 may supply target temperature data to thermal control loop 115.

As discussed above, EM control loop 210 may operate based on current measurement and thermal data inputs and may compare these values (or an output of a function that operates on these values) to a set point. Thermal control loop 115 may operate based on thermal data as an input and may compare thermal values to the target temperature provided by the EM control loop 210.

In some embodiments, thermal control loop 115 and EM control loop 210 are nested loops.

In some situations, the device may not engage EM control loop 210 and thermal control loop 115 may receive default target temperature data. As shown, thermal control loop 115 may generate a control signal to the processor circuitry.

Note that disclosed control loops may advantageously mitigate both thermal and EM effects by introducing EM control loops into a thermal control design, in some embodiments. The chaining of loop controls may achieve performance goals with limited overhead. In other embodiments, EM and thermal control loops may operate in other fashions, e.g., in parallel. In parallel embodiments, control circuitry may include logic to determine signaling to the processor circuitry based on the output of both loops at a given point in time.

Example Distributed PMU Architecture

Figure 3:
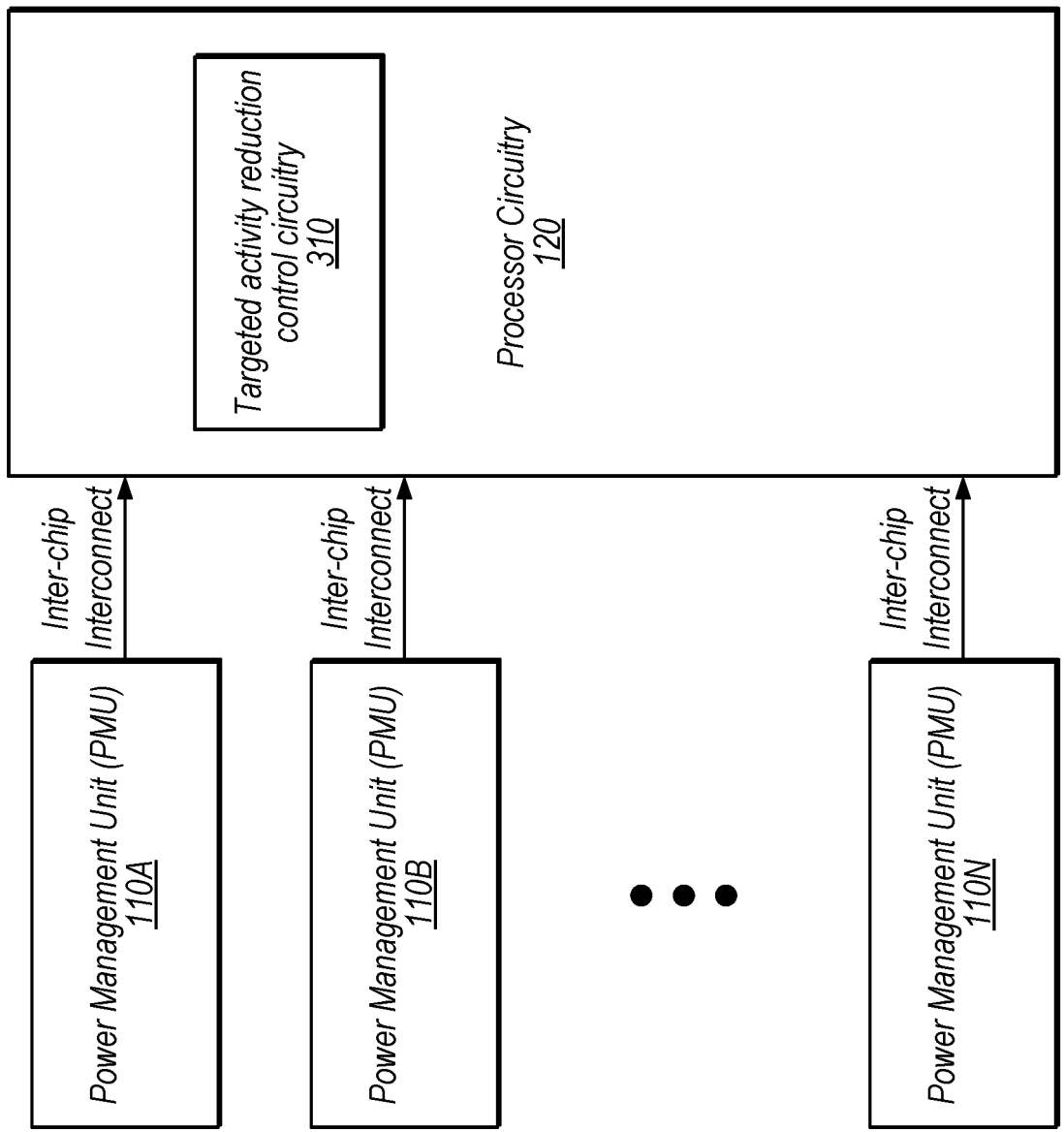
FIG. 3 is a block diagram illustrating an example distributed power management unit (PMU) architecture with targeted activity reduction, according to some embodiments.

FIG. 3 is a block diagram illustrating a distributed architecture with multiple PMUs, according to some embodiments. In the illustrated embodiment, a system includes PMUs 110A-110N and processor circuitry 120. Processor circuitry 120 includes targeted activity reduction control circuitry 310, in the illustrated embodiment.

In some embodiments, targeted activity reduction control circuitry 310 is configured to receive activity control signals, via inter-chip interconnects, from multiple PMUs 110 and perform targeted activity reduction on select portions of processor circuitry 120. For example, a graphics processing unit (GPU) and central processing unit (CPU) of processor circuitry 120 may be separately powered by PMUs 110A and 110B, respectively. In situations where PMU 110A experiences thermal issues due to the load of the GPU, PMU 110A may issue activity control signals to targeted activity reduction control circuitry 310 to perform activity reduction of the GPU, while the CPU may remain in its current operating state.

In some embodiments, a given PMU may control multiple rails and may implement separate control loops for the separate rails and separate control signaling to the processor circuitry 120, which may perform targeted activity management as discussed above.

Disclosed targeted activity reduction techniques may advantageously increase performance, relative to blanket activity reductions, by allowing circuitry that is not causing thermal issues to continue operations without activity reduction.

Detailed Example EM and Thermal Loops

Figure 4:
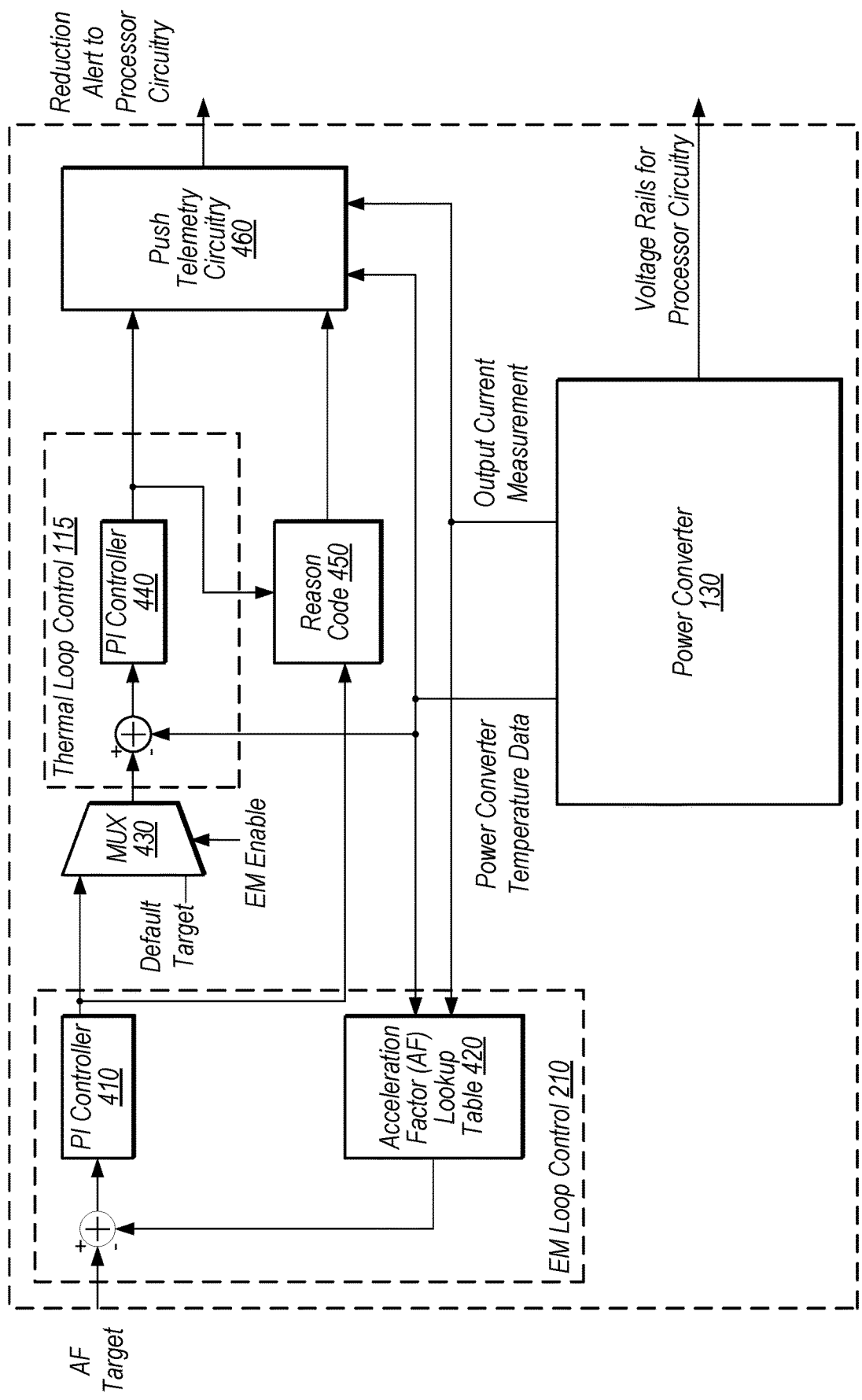
FIG. 4 is a block diagram illustrating a detailed example PMU that implements both an EM loop control and a thermal loop control, according to some embodiments.

FIG. 4 is a block diagram illustrating detailed thermal loop control circuitry, according to some embodiments. In the illustrated embodiment, a system includes EM loop control 210, multiplexer (MUX) 430, thermal loop control 115, reason code 450, push telemetry circuitry 460, and power converter 130.

In the illustrated embodiment, EM loop control 210 generates an output target temperature. The target temperature generated by EM loop control 210 is provided as an input to thermal loop control 115, when selected by MUX 430. Thermal loop control 115 is configured to generate control signals to be sent to push telemetry circuitry 460, which is configured to issue reduction alerts to processor circuitry. Reason code 450 is also configured to generate debug signals to be sent to push telemetry circuitry 460, e.g., to indicate which thermal control loop is causing control signaling. The reduction alert may reduce activity on the voltage rails provided by the power converter 130, thereby affecting the output current and temperature of the power converter 130.

EM loop control 210, in the illustrated embodiment, includes a proportional integral (PI) controller 410 configured to provide control signaling based on calculated error signals and an acceleration factor (AF) lookup table 420 configured to convert raw temperature and electrical current data into an AF. In some embodiments, an acceleration factor may be determined by circuitry implementing a function or may be determined by software. In some embodiments, software can modify the AF lookup table based on device aging or lifetime/reliability limits. The acceleration factor may represent the ratio of the degradation rate at an elevated temperature to that at a low temperature.

In some embodiments, EM loop control 210 outputs a target temperature for thermal loop control 115. In some situations, the PMU may disengage the EM loop control 210 and control MUX 430 to provide a default target to the thermal loop control 115. For example, in the illustrated embodiment, MUX 430 selects the target temperature based on an EM enable control signal. EM loop control 210 may periodically read temperature and electrical current data and use the AF lookup table 420 to convert raw values to an AF. EM loop control 210 calculates an error signal, via PI controller 410, using feedback relative to a set point AF target to generate an output target temperature.

A PI controller is a feedback control loop that calculates an error signal by taking the difference between the output of a system and some set point reference. The proportional feature of a PI controller acts as a multiplication factor that is applied to the input signal to generate an output. Similarly, the integrating feature of a PI controller acts as a summation of the error signal over time, which is generally moving to and from the desired output or set point reference. Any of various appropriate types of loop control may be used in other embodiments in addition to or in place of PI controllers. Non-limiting examples of other types of control loops include: proportional integral derivative (PID) loop control, fractional-order PID (FOPID) loop control, Commande Robuste d'Ordre Non Entier (CRONE) loop control, etc. Generally, the control loops may determine a difference between a target value and a current value and output control signaling based on the difference, in order to minimize the difference, e.g., to reduce activity to mitigate issues or increase activity when conditions are satisfactory.

Thermal loop control 115, in some embodiments, is configured to calculate an error signal, using PI controller 440, using feedback relative to a target temperature to generate an output control signal. Thermal control loop 115 propagates calculated error signals to push telemetry circuitry 460 which stores the data and generates reduction alerts to processor circuitry in certain situations. The reduction alerts may be transmitted via an inter-chip interconnect, which may utilize a system power management interface (SPMI) protocol, for example.

In some embodiments, EM loop control 210 and thermal loop control 115 are implemented using custom circuitry. In other embodiments, EM loop control 210 and thermal loop control 115 are implemented by firmware running on a PMU microcontroller or processor. In some embodiments, the PMU control functions reside in the same component as the power converter itself, as indicated by the dashed box in FIG. 4.

In some embodiments, thermal loop control 115 and EM loop control 210 are nested loops.

Reason code 450, in some embodiments, receives the outputs of the different loop controls 210 and 115 and provides reason codes to the push telemetry circuitry 460. These codes may indicate a set of one or more control loops are currently engaged.

Push telemetry circuitry 460, in some embodiments, is configured to issue reduction alerts to processor circuitry based on control signals it receives from thermal loop control 115. Generally, push telemetry circuitry 460 may aggregate data until one or more conditions are met and then push a reduction alert signal to processor circuitry 120. This push topology, combined with control located on the PMU, may allow the processor circuitry 120 to avoid polling the PMU for control data by pushing signals only when action by the processor circuitry 120 may be needed.

U.S. application Ser. No. 17/313,837, filed May 6, 2021 and U.S. application Ser. No. 16/543,334, filed Aug. 16, 2019 describe example telemetry push aggregation techniques and dashboard with push model techniques for sensor data, respectively. In some embodiments, push telemetry circuitry 460 may be configured to operate as discussed in these two applications.

Power converter 130 may be configured as described above with reference to FIG. 1. Power converter may include multiple sensors of a given type (e.g., thermal sensors or output current sensors) and may separately report measurements or may aggregate the measurements before reporting.

In some embodiments, EM loop control 210, MUX 430, thermal loop control 115, reason code 450, push telemetry circuitry 460, and power converter 130 are included in a single physical component, represented by the outer dashed-line box of FIG. 4. In other embodiments, various elements may be included in different physical components.

Note that FIG. 4 shows detailed implementations of an EM loop and thermal loop for purposes of explanation, but is not intended to limit the scope of the present disclosure. In other embodiments, any of various appropriate circuitry may be implemented, e.g., using different types of loop controllers, different numbers of loop controllers, different encodings, different control signal reporting techniques, etc.

Example Method

Figure 5:
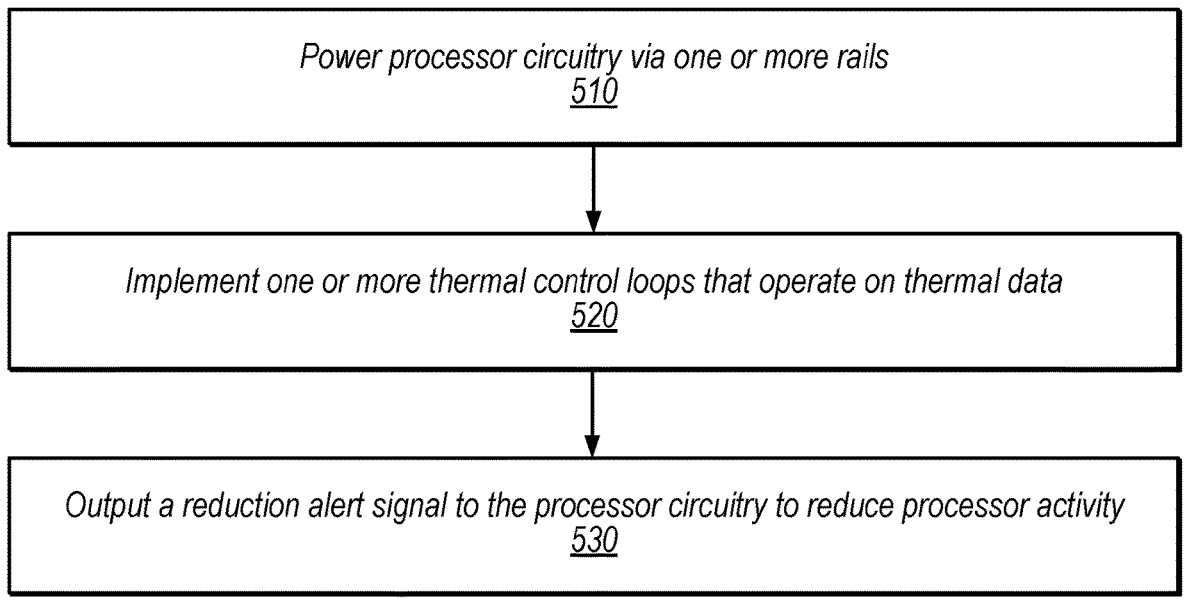
FIG. 5 is a flow diagram illustrating an example method, according to some embodiments.

FIG. 5 is a flow diagram illustrating an example method for operating one or more thermal control loops, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, a power converter (e.g., power converter 130) powers the processor circuitry via one or more rails.

At 520, in the illustrated embodiment, a power management unit (PMU) circuit implements one or more thermal control loops that operate on thermal data. The PMU circuity may be further configured to implement one or more electromigration (EM) control loops that operate on electrical current measurement data from the power converter as an input. The one or more EM control loops may generate an output target temperature for at least one thermal control loop implemented by the PMU circuitry.

In some embodiments, the PMU circuitry includes push telemetry circuitry configured to initiate signals to the processor circuitry based on values in push telemetry storage. The PMU circuitry may further be configured to provide output data from at least one of the one or more thermal control loops to the push telemetry storage.

In some embodiments, the PMU circuitry is configured to generate, based on status of the one or more EM control loops and the one or more thermal control loops, reason code data that indicates a set of control loops that are currently engaged, and transmit the reason code data to the processor circuitry.

At 530, in the illustrated embodiment, the power management unit circuitry outputs a reduction alert signal to the processor circuitry to reduce processor activity.

In some embodiments, the PMU circuitry is configured to generate a second signal to the processor circuitry in response to a temperature measurement from the power converter meeting a temperature threshold and the processor circuitry is configured to further reduce processor activity in response to the second signal. The processor circuitry may further be configured to halt and power down in response to the second signal.

In some embodiments, the method includes multiple PMU circuits configured to control different sets of power converters, independently generate reduction alert signals based on PMU-implemented thermal control loops, and where the processor circuitry includes control circuitry configured to perform targeted performance reduction for portions of the processor circuitry that are powered by one or more PMU circuits that assert reduction alert signals.

Example Device

Figure 6:
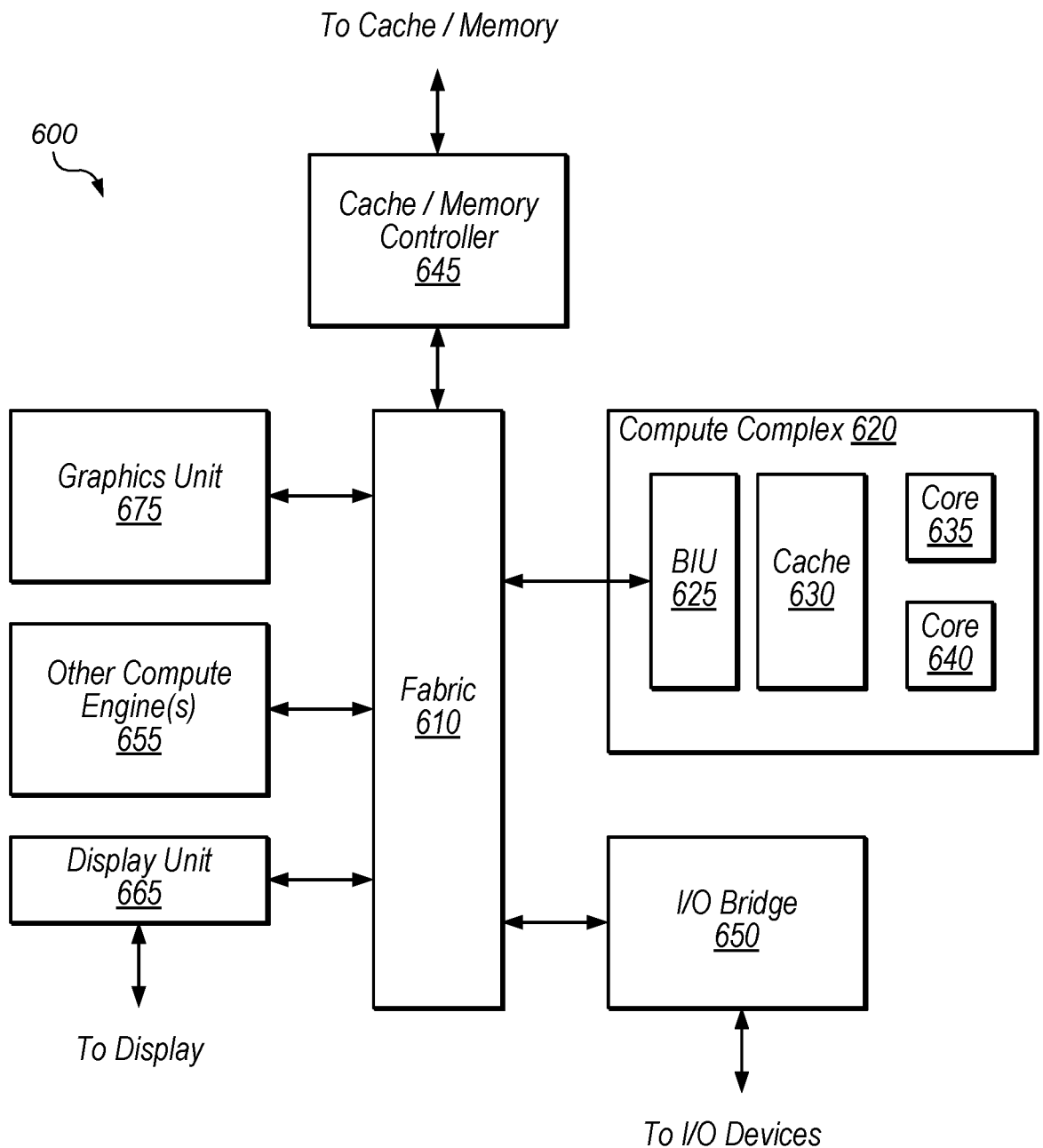
FIG. 6 is a block diagram illustrating an example computing device, according to some embodiments.

Referring now to FIG. 6, a block diagram illustrating an example embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 675, and display unit 665. In some embodiments, device 600 may include other components (not shown) in addition to or in place of the illustrated components, such as video processor encoders and decoders, image processing or recognition elements, computer vision elements, etc.

Various elements of FIG. 6 may be included in one or more chips (e.g., an SoC) powered by one or more PMUs that implement disclosed techniques.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and caches. For example, compute complex 620 may include 1, 2, or 4 processor cores, or any other suitable number. In one embodiment, cache 630 is a set associative L2 cache. In some embodiments, cores 635 and 640 may include internal instruction and data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 675 may be described as "coupled to" a memory through fabric 610 and cache/memory controller 645. In contrast, in the illustrated embodiment of FIG. 6, graphics unit 675 is "directly coupled" to fabric 610 because there are no intervening elements.

Graphics unit 675 may include one or more processors, e.g., one or more graphics processing units (GPU's). Graphics unit 675 may receive graphics-oriented instructions, such as OPENGL®, Metal, or DIRECT3D® instructions, for example. Graphics unit 675 may execute specialized GPU instructions or perform other operations based on the received graphics-oriented instructions. Graphics unit 675 may generally be configured to process large blocks of data in parallel and may build images in a frame buffer for output to a display, which may be included in the device or may be a separate device. Graphics unit 675 may include transform, lighting, triangle, and rendering engines in one or more graphics processing pipelines. Graphics unit 675 may output pixel information for display images. Graphics unit 675, in various embodiments, may include programmable shader circuitry which may include highly parallel execution cores configured to execute graphics programs, which may include pixel tasks, vertex tasks, and compute tasks (which may or may not be graphics-related).

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

Other compute engine(s) 655 may include any of various other component types included on a chip or in a computing system. Non-limiting examples include a radio modem, external interfaces for communication protocols (e.g., UART, SPI, etc.), a digital signal processor, etc.

I/O bridge 650 may include various elements configured to implement: universal serial bus (USB) communications, security, audio, and low-power always-on functionality, for example. I/O bridge 650 may also include interfaces such as pulse-width modulation (PWM), general-purpose input/output (GPIO), serial peripheral interface (SPI), and inter-integrated circuit (I2C), for example. Various types of peripherals and devices may be coupled to device 600 via I/O bridge 650.

In some embodiments, device 600 includes network interface circuitry (not explicitly shown), which may be connected to fabric 610 or I/O bridge 650. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 600 with connectivity to various types of other devices and networks.

Example Applications

Figure 7:
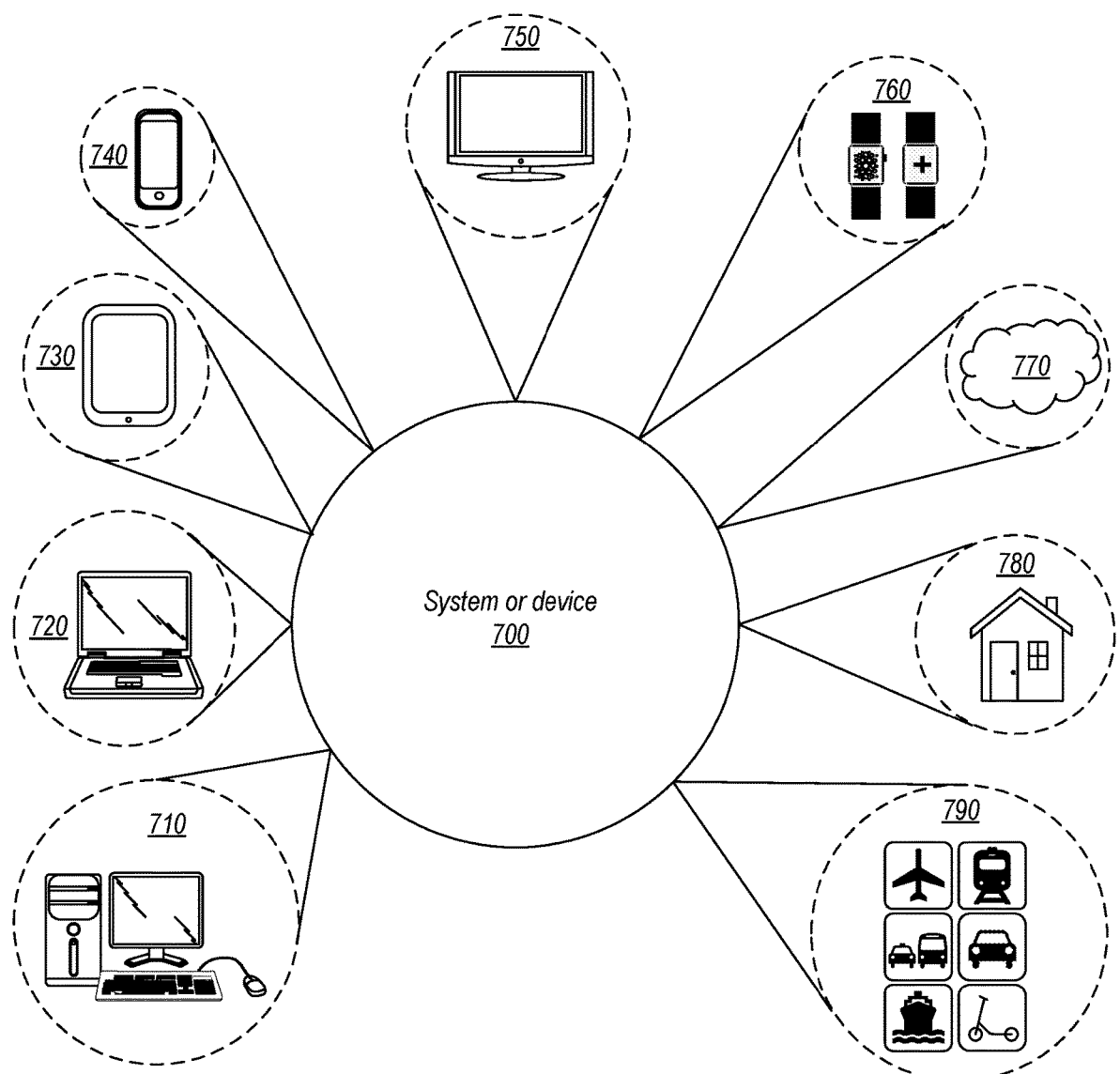
FIG. 7 is a diagram illustrating example applications of disclosed systems and devices, according to some embodiments.

Turning now to FIG. 7, various types of systems that may include any of the circuits, devices, or system discussed above. System or device 700, which may incorporate or otherwise utilize one or more of the techniques described herein, may be utilized in a wide range of areas. For example, system or device 700 may be utilized as part of the hardware of systems such as a desktop computer 710, laptop computer 720, tablet computer 730, cellular or mobile phone 740, or television 750 (or set-top box coupled to a television).

Similarly, disclosed elements may be utilized in a wearable device 760, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 700 may also be used in various other contexts. For example, system or device 700 may be utilized in the context of a server computer system, such as a dedicated server or on shared hardware that implements a cloud-based service 770. Still further, system or device 700 may be implemented in a wide range of specialized everyday devices, including devices 780 commonly found in the home such as refrigerators, thermostats, security cameras, etc. The interconnection of such devices is often referred to as the "Internet of Things" (IoT). Elements may also be implemented in various modes of transportation. For example, system or device 700 could be employed in the control systems, guidance systems, entertainment systems, etc. of various types of vehicles 790.

The applications illustrated in FIG. 7 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 8:
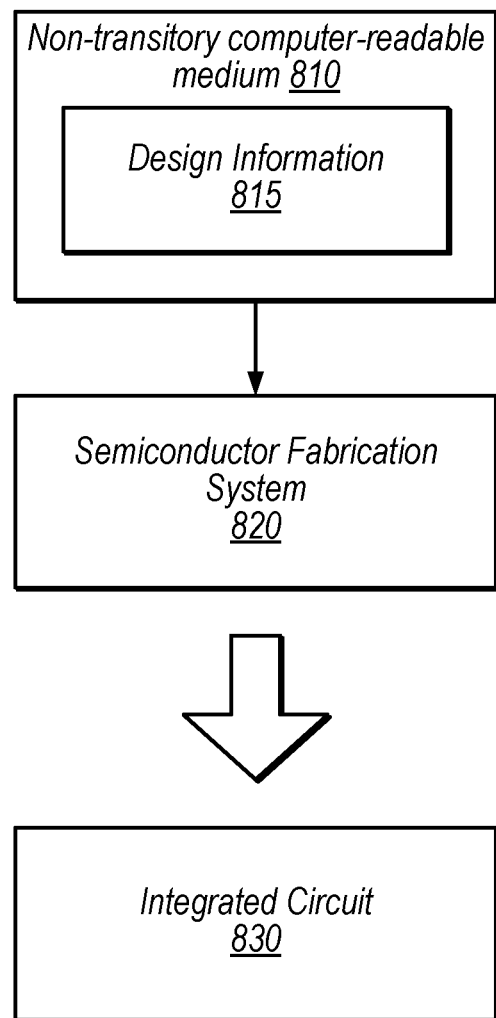
FIG. 8 is a block diagram illustrating an example computer-readable medium that stores circuit design information, according to some embodiments.

FIG. 8 is a block diagram illustrating an example non-transitory computer-readable storage medium that stores circuit design information, according to some embodiments. In the illustrated embodiment semiconductor fabrication system 820 is configured to process the design information 815 stored on non-transitory computer-readable medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis, layout, or both of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIGS. 1, 2, 3, 4 and 6. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . ." does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set, of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
  processor circuitry included on a first chip;
  a power converter configured to power the processor circuitry via one or more rails;
  power management unit (PMU) circuitry, on a second chip, configured to:
    implement one or more thermal control loops that operate on thermal data from the power converter as an input; and
    output a reduction alert signal to the processor circuitry, via an inter-chip communications interconnect coupled to the first and second chips, based on the thermal data;
  wherein the processor circuitry is configured to reduce its processing activity in response to the reduction alert signal.

2. The apparatus of claim 1,
  wherein the PMU circuitry includes push telemetry circuitry configured to initiate signals to the processor circuitry based on values in push telemetry storage; and
  wherein the PMU circuitry is configured to provide output data from at least one thermal control loop to the push telemetry storage.

3. The apparatus of claim 1, wherein the PMU circuitry is further configured to implement one or more electromigration (EM) control loops that operate on electrical current measurement data from the power converter as an input.

4. The apparatus of claim 3, wherein the PMU circuitry is further configured to:
  generate, based on status of the one or more EM control loops and the one or more thermal control loops, reason code data that indicates a set of control loops that are currently engaged; and
  transmit the reason code data to the processor circuitry.

5. The apparatus of claim 3, wherein the EM control loop generates an output target temperature for at least one thermal control loop implemented by the PMU circuitry.

6. The apparatus of claim 1, wherein the PMU circuitry is configured to generate a second signal to the processor circuitry in response to a temperature measurement from the power converter meeting a temperature threshold and the processor circuitry is configured to further reduce processor activity in response to the second signal.

7. The apparatus of claim 6, wherein the processor circuitry is configured to halt and power down in response to the second signal.

8. The apparatus of claim 1, wherein the apparatus includes multiple PMU circuits configured to control different sets of power converters;
  wherein the PMU circuits are configured to independently generate reduction alert signals based on PMU-implemented thermal control loops;
  wherein the processor circuitry includes control circuitry configured to perform targeted performance reduction for portions of the processor circuitry that are powered by one or more PMU circuits that assert reduction alert signals.

9. The apparatus of claim 1, wherein the apparatus is a computing device that further includes:
  network interface circuitry;
  wherein the processor circuitry includes a central processing unit and a graphics processor.

10. A method, comprising:
  powering, by a power converter, processor circuitry on a first chip via one or more rails;
  implementing, by power management unit (PMU) circuitry on a second chip, one or more thermal control loops that operate on thermal data from the power converter as an input; and
  outputting a reduction alert signal to the processor circuitry, by the PMU circuitry via an inter-chip communications interconnect coupled to the first and second chips, based on the thermal data; and
  reducing, by the processor circuitry, its processing activity in response to the reduction alert signal.

11. The method of claim 10, further comprising:
  initiating, by push telemetry circuitry, signals to the processor circuitry based on values in push telemetry storage; and
  providing, by PMU circuitry, output data from at least one thermal control loop to the push telemetry storage.

12. The method of claim 10, further comprising:
  implementing, by the PMU circuitry, one or more electromigration (EM) control loops that operate on electrical current measurement data from the power converter as an input.

13. The method of claim 12, further comprising:
  generating, by the EM control loop implemented by the PMU circuitry, an output target temperature for at least one thermal control loop implemented by the PMU circuitry.

14. The method of claim 10, further comprising:
  generating, by the PMU circuitry, a second signal to the processor circuitry in response to a temperature measurement from the power converter meeting a temperature threshold and the processor circuitry reducing processor activity in response to the second signal; and
  halting and powering down the processor circuitry in response to the second signal.

15. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
  processor circuitry included on a first chip;
  a power converter configured to power the processor circuitry via one or more rails;
  power management unit (PMU) circuitry, on a second chip, configured to:
    implement one or more thermal control loops that operate on thermal data from the power converter as an input; and output a reduction alert signal to the processor circuitry, via an inter-chip communications interconnect coupled to the first and second chips, based on the thermal data;

wherein the processor circuitry is configured to reduce its processing activity in response to the reduction alert signal.

16. The non-transitory computer readable medium of claim 15, wherein the PMU circuitry includes push telemetry circuitry configured to initiate signals to the processor circuitry based on values in push telemetry storage; and wherein the PMU circuitry is configured to provide output data from at least one thermal control loop to the push telemetry storage.

17. The non-transitory computer readable medium of claim 15, wherein the PMU circuitry is further configured to implement one or more electromigration (EM) control loops that operate on electrical current measurement data from the power converter as an input.

18. The non-transitory computer readable medium of claim 17, wherein the EM control loop generates an output target temperature for at least one thermal control loop implemented by the PMU circuitry.

19. The non-transitory computer readable medium of claim 17, wherein the PMU circuitry is further configured to:

generate, based on status of the one or more EM control loops and the one or more thermal control loops, reason code data that indicates a set of control loops that are currently engaged; and transmit the reason code data to the processor circuitry.

20. The non-transitory computer readable medium of claim 15, wherein the circuit includes multiple PMU circuits configured to control different sets of power converters;

wherein the PMU circuits are configured to independently generate reduction alert signals based on PMU-implemented thermal control loops;

wherein the processor circuitry includes control circuitry configured to perform targeted performance reduction for portions of the processor circuitry that are powered by one or more PMU circuits that assert reduction alert signals.

* * * * *